United States Patent
Kovacs et al.

(10) Patent No.: US 11,486,434 B2
(45) Date of Patent: Nov. 1, 2022

(54) RAIL MOUNTING APPARATUS, SYSTEM AND METHOD OF SECURING DEVICES TO A STRUCTURE

(71) Applicant: PMC Industries, Inc., Plainville, CT (US)

(72) Inventors: Tamas Kovacs, Burlington, CT (US); Robert Mercier, Newington, CT (US)

(73) Assignee: PMC Industries, Inc., Plainville, CT (US)

( * ) Notice: Subject to any disclaimer, the term of this patent is extended or adjusted under 35 U.S.C. 154(b) by 113 days.

(21) Appl. No.: 17/060,073

(22) Filed: Sep. 30, 2020

(65) Prior Publication Data
US 2021/0102577 A1 Apr. 8, 2021

(51) Int. Cl.
| | |
|---|---|
| *F16B 37/04* | (2006.01) |
| *F16C 29/12* | (2006.01) |
| *H02S 20/20* | (2014.01) |
| *F16B 7/04* | (2006.01) |
| *F24S 25/632* | (2018.01) |
| *F24S 25/636* | (2018.01) |
| *F24S 25/61* | (2018.01) |
| *H02S 20/23* | (2014.01) |
| *F24S 25/30* | (2018.01) |
| *F24S 25/60* | (2018.01) |

(52) U.S. Cl.
CPC .......... *F16B 37/046* (2013.01); *F16B 7/0473* (2013.01); *F16C 29/123* (2013.01); *F24S 25/61* (2018.05); *F24S 25/632* (2018.05); *F24S 25/636* (2018.05); *H02S 20/20* (2014.12); *H02S 20/23* (2014.12); *F24S 25/30* (2018.05); *F24S 2025/6003* (2018.05); *F24S 2025/6005* (2018.05); *Y02E 10/50* (2013.01)

(58) Field of Classification Search
CPC .... F16B 7/0473; F16B 37/046; F16C 29/123; F24S 25/61; F24S 25/632; F24S 25/636; F24S 25/30; F24S 2025/6003; F24S 2025/6005; H02S 20/20; H02S 20/23
See application file for complete search history.

(56) References Cited

U.S. PATENT DOCUMENTS

| | | | | |
|---|---|---|---|---|
| 3,483,910 | A | * 12/1969 | Van Huffel | F16B 37/046 411/84 |
| 8,640,401 | B2 | * 2/2014 | Hong | F24S 25/636 52/173.3 |

(Continued)

FOREIGN PATENT DOCUMENTS

| | | | | |
|---|---|---|---|---|
| CN | 201936895 U | * 8/2011 | ............. | F24J 2/5258 |
| CN | 202585459 U | * 12/2012 | ............. | F24S 25/30 |

(Continued)

*Primary Examiner* — Jessie T Fonseca
(74) *Attorney, Agent, or Firm* — Damian Wasserbauer, Esq.; Nicholas Blanton, Esq.; Wasserbauer Law LLC

(57) ABSTRACT

A retention apparatus, system and method of attaching items, panels or other devices to a rail formed in longitudinal lengths configured with a cross-sectional profile having multiple cooperating structures between the rail and a channel nut including a recess formed between a tooth and shelf on an interior first channel portion of the rail and a flange of the channel nut, between an anchor latch of the rail and hook flange on the channel nut, and cooperating forces and movement of the biasing element secured to the channel nut.

1 Claim, 20 Drawing Sheets

(56) References Cited

U.S. PATENT DOCUMENTS

| | | | |
|---|---|---|---|
| 9,850,661 B2 | 12/2017 | Kovacs | |
| 10,205,418 B2 * | 2/2019 | Nayar | F24S 25/636 |
| 10,218,305 B1 * | 2/2019 | Schrock | H02S 20/20 |
| 10,469,022 B2 * | 11/2019 | Kovacs | H02S 30/00 |
| 10,951,157 B1 * | 3/2021 | Young | H02S 30/10 |
| 11,041,314 B2 | 6/2021 | Kovacs | |
| 2011/0126881 A1 * | 6/2011 | Hong | F24S 25/636 |
| | | | 136/244 |
| 2018/0135891 A1 * | 5/2018 | Li | F24S 25/636 |
| 2019/0068110 A1 * | 2/2019 | McPheeters | F24S 25/61 |
| 2019/0273460 A1 * | 9/2019 | Kovacs | H02S 20/23 |
| 2020/0313604 A1 * | 10/2020 | Harris | F24S 25/70 |

FOREIGN PATENT DOCUMENTS

| | | | | |
|---|---|---|---|---|
| CN | 204376810 U | * | 6/2015 | |
| CN | 104980094 A | * | 10/2015 | F16M 13/02 |
| CN | 108708505 A | * | 10/2018 | E04D 13/0481 |
| DE | 202010013976 U1 | * | 1/2011 | F24J 2/5205 |
| DE | 202012004615 U1 | * | 9/2012 | F24J 2/5247 |
| WO | WO-2009137887 A1 | * | 11/2009 | F24J 2/5205 |

\* cited by examiner

US 11,486,434 B2

RAIL MOUNTING APPARATUS, SYSTEM AND METHOD OF SECURING DEVICES TO A STRUCTURE

CROSS-REFERENCE TO RELATED APPLICATION

This application claims priority to and the benefit of U.S. Provisional Patent Application No. 62/874,953 entitled "Rail Apparatus, System And Method Using Channel Nut", filed on Jul. 17, 2019, the entire disclosure of which is hereby incorporated herein by reference.

FIELD OF THE INVENTION

The present invention relates to retention systems for securing panels or other devices to a structure and more particularly to a rail having an attachment systems capable of: engaging the rail by pushing into one or more openings of the rail, maintaining position on the rail, and securing the respective rail and channel nut to the structure or earth.

BACKGROUND OF THE INVENTION

Solar panels are typically mounted over a surface of the structure such as residential or commercial building rooftops, or to the earth as in solar arrays, using solar panel mounting systems that are secured to the structure, for example, by rafters, support beams, anchoring posts, pads, and the like, in a portrait or landscape orientation. Typically, arrays of PV modules are installed in a portrait orientation having the rails running perpendicular to the support beam. However, arrays can be installed in a landscape orientation with the rails running parallel with the support beam, each portrait or landscape having the long side of the PV module running perpendicular to the rails. These mounting systems commonly include a series of longitudinal rails, that span the length of a rooftop, that are secured to the structure using a variety of fastener and mount system designs. Typically, each PV module rests on an upper edge of a plurality of rails so that a fastener assembly may securing the frame edges of the PV to the structure to maintain a spaced apart distance and/or inclined angle from the structure or earth.

Typical rails use attachment systems having a fastener and/or nut to engage the rail in several ways such as, for example, sliding into a rail opening directly accompanied by rotation of the fastener, nut and/or rail. In other fastener assemblies, a shape profile of the nut is a dimensioned to slide into an open end of lengths of the longitudinal rail. There are disadvantages to these attachment systems moving along the rail or disengaging therefrom during installation, whereby reduced safety on the structure may be result because of additional installation time, increases in materials used may result. There is a need for a rail mounting system having a fastener assembly that can be inserted directly into the channel of the rail and retained in a desired position so as to allow for placement of the fasteners and positioning on rail to assist the installers when operating on the structure. There is a need for a retention system for securing PV Panels and other devices quickly using a fastener assembly with a channel nut that can be inserted directly into the channel of the rail and retained in a desired position.

SUMMARY OF THE INVENTION

It is an object of the present invention to provide retention apparatus, system and method of attaching items, panels or other devices using a channel nut having a biasing element to operably connect to interior structures.

It is an object of the present invention to form the rail in longitudinal lengths configured with a cross-sectional profile having multiple cooperating interior structures between the rail and a channel nut including a recess formed between a tooth and shelf on an interior first channel portion of the rail and a flange of the channel nut, between an anchor latch of the rail and hook flange on the channel nut, and cooperating forces and movement of the biasing element secured to the channel nut.

It is an object of the present invention to provide a retention apparatus, system and method of attaching items, panels or other devices using a channel nut and a rail advantageously of a simplified construction and assembly that satisfies a long felt need for installing panels and devices to a structure.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DESCRIPTION OF THE EMBODIMENTS

Figure 1:
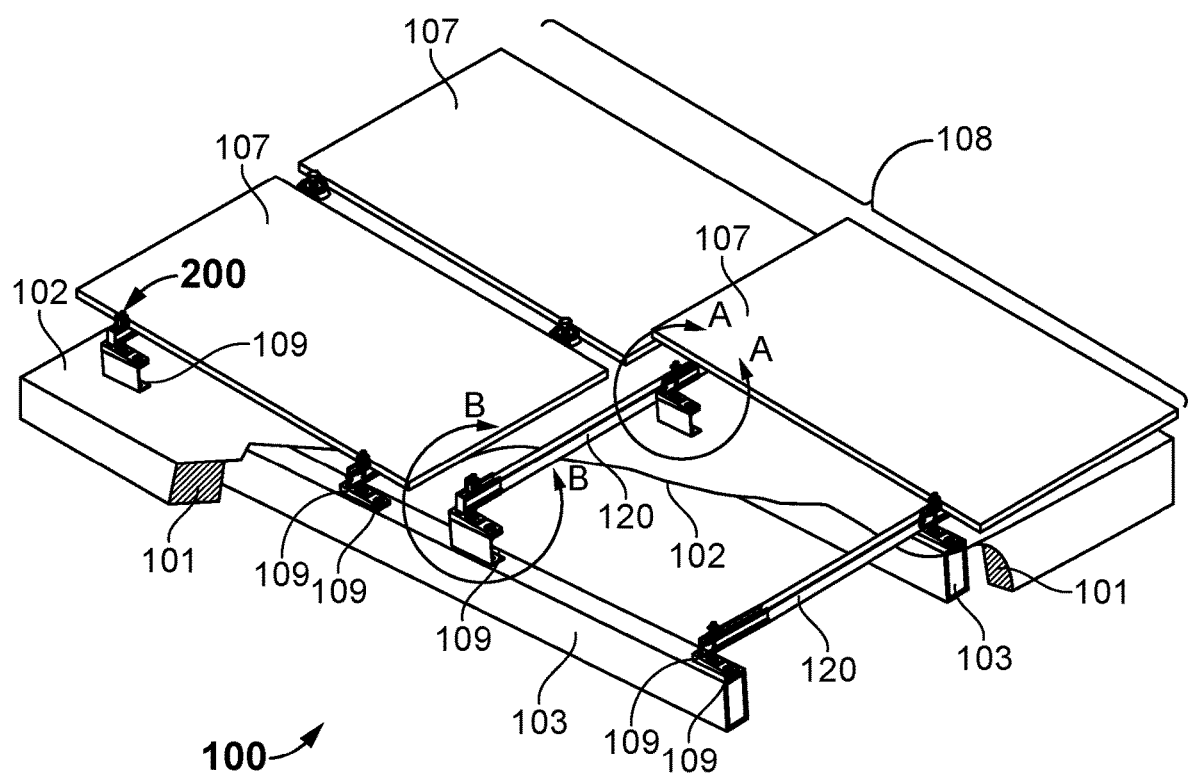
FIG. 1 illustrates a perspective view of the rail and channel nut apparatus, system and method in portrait position according to an embodiment of the invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Additionally, the term "structure" refers to earth or a structure to secure the rail 120 thereto, for example, the structure can be a pad, post, anchor, bracket, other support. It is to be appreciated that the features of rail 120 can be formed integral or within any structure as needed to fasten the channel nut thereto. It will be appreciated that the type of support need not be limited to a structure that is a part of a solar panel racking system or solar panel support system.

Referring to FIGS. 1-22A-22B, a retention apparatus, system and method of attaching items, panels or other devices to a structure, which is generally identified as element 100 herein. The retention system 100 is described in an embodiment of securing a solar panel or photo-voltaic (PV) module 107 to mount to a structure such as a building, house, roof, structures disposed in the earth in solar arrays, and the like. It will be appreciated that the features of the retention system 100 can allow the retention system 100 to install solar panel racking systems efficiently and quickly. It is to be understood that what has been described are exemplary embodiments of the invention such that appreciate that the channel nut will be capable of securing within the rail to permit the channel nut to be located at a desired location along the length of the rail, or structure incorporating the features of the rail, thereby further facilitating the installation of the retention system 100 to other installations and fields of use such as aircraft, vehicles and other industrial applications.

Figure 2:
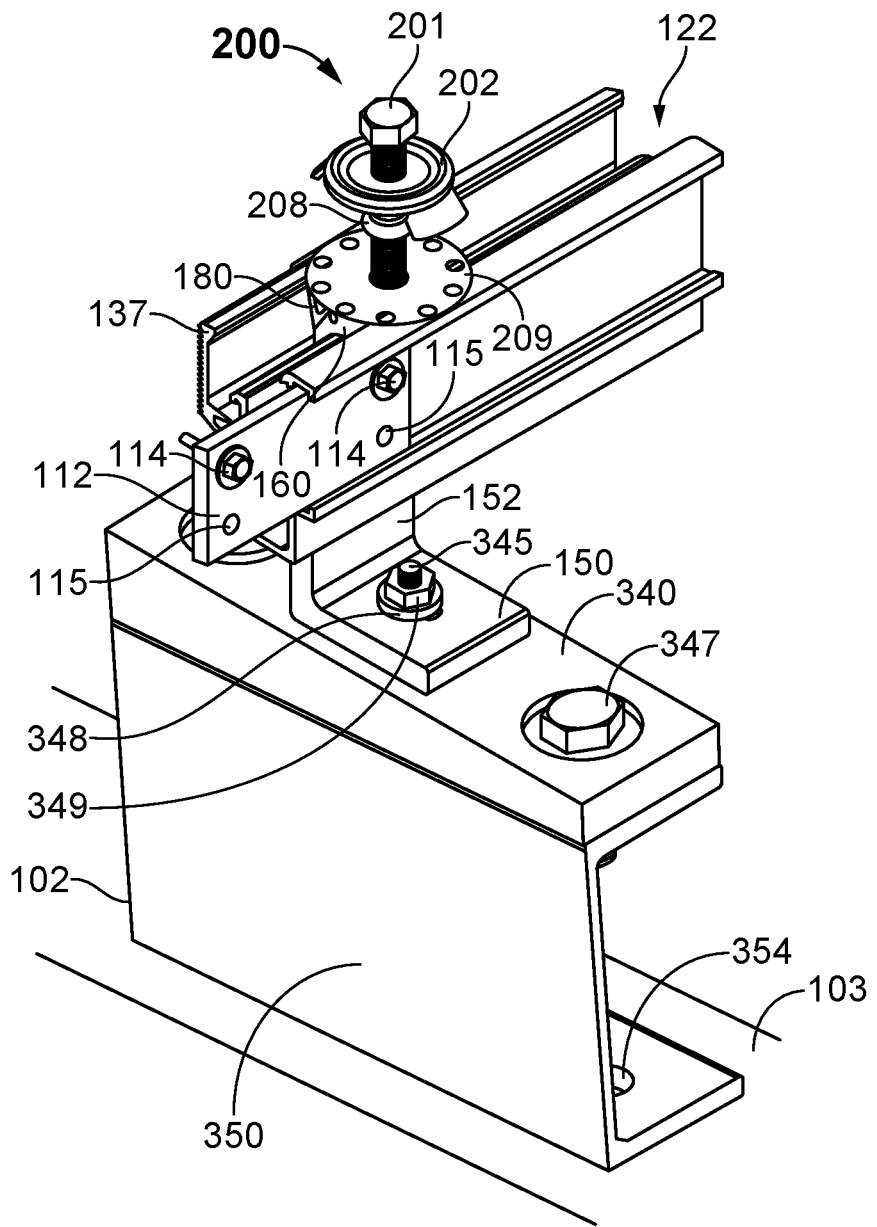
FIG. 2 illustrates an enlarged view, taken along lines A-A of FIG. 1, of the rail and channel nut apparatus, system and method according to an embodiment of the invention.
Figure 3:
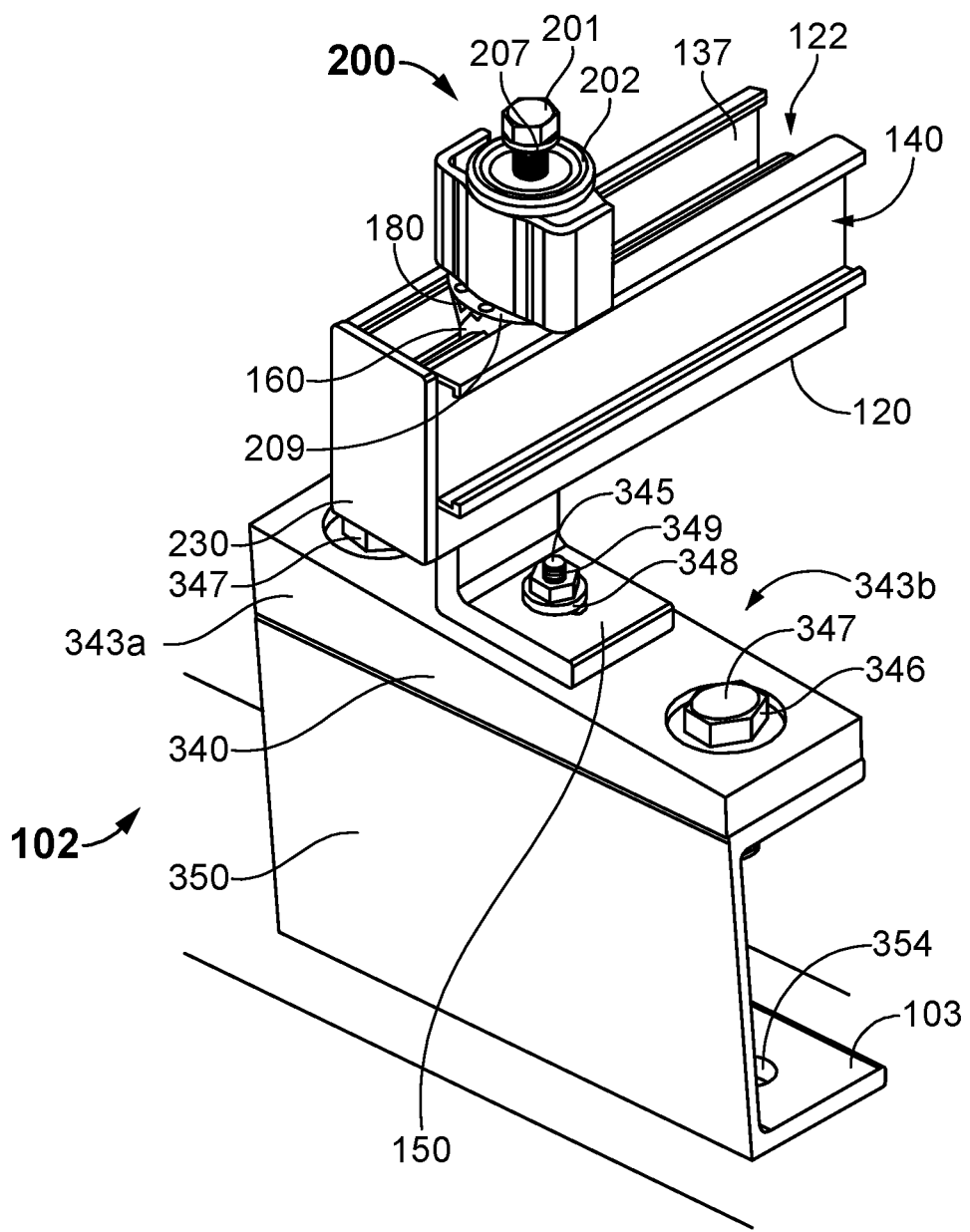
FIG. 3 illustrates an enlarged view, taken along lines b-b of FIG. 1, of the rail and channel nut apparatus, system and method according to an embodiment of the invention.
Figure 4:
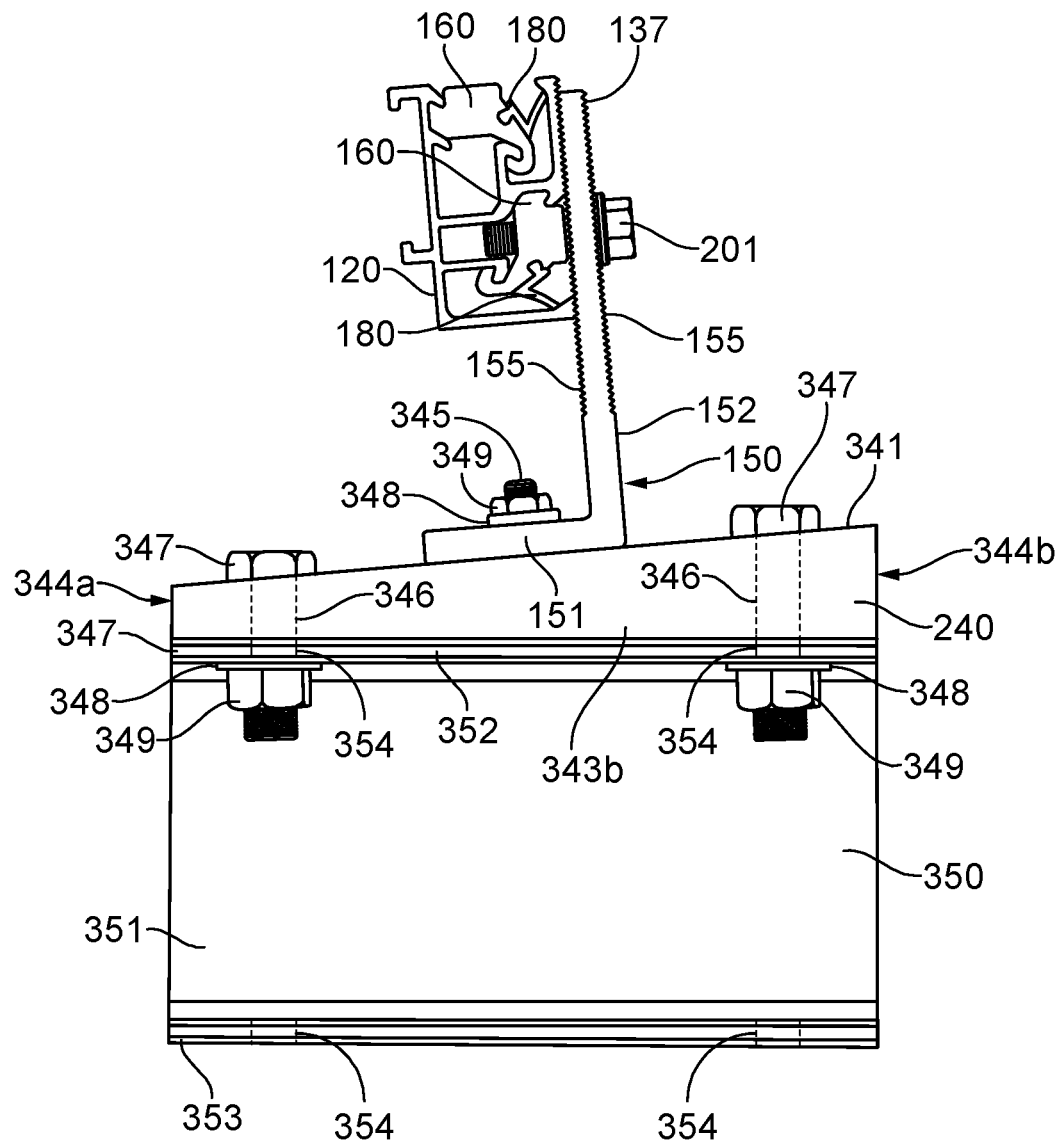
FIG. 4 illustrates a side view of the invention in a landscape position thereof.
Figure 5:
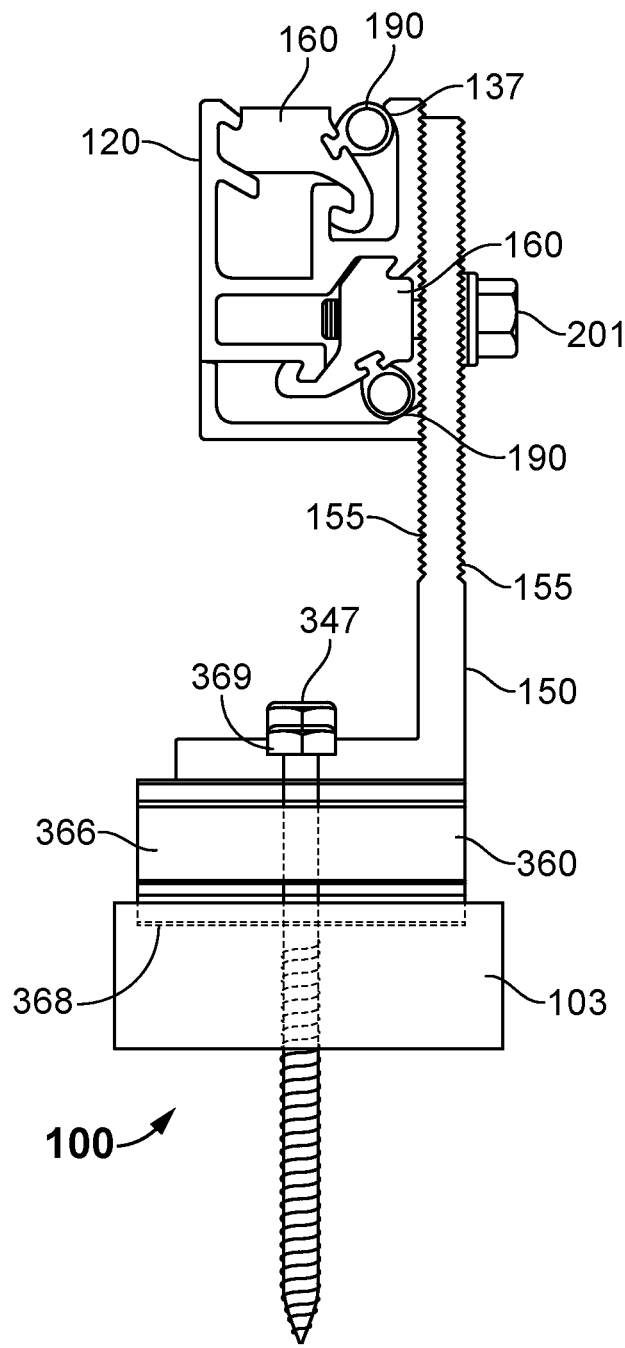
FIG. 5 illustrates a side view of another embodiment of the invention.
Figure 6A:
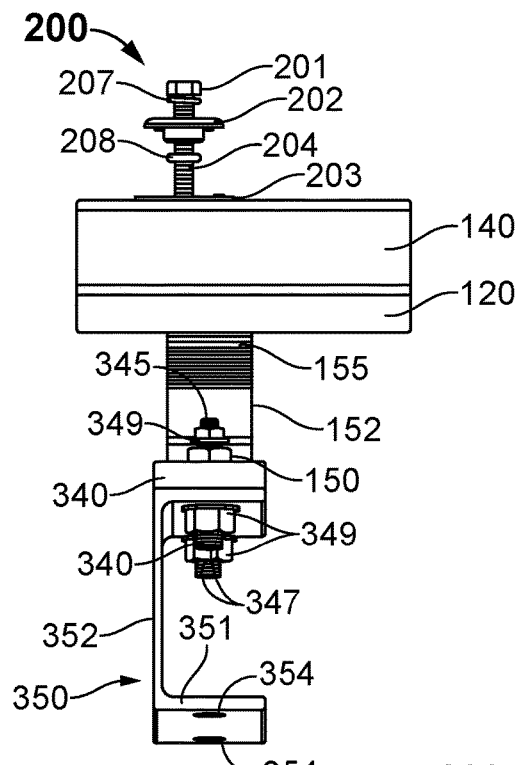
FIGS. 6A, 6B and 6C illustrate front, top and back views, respectively, of the invention thereof.
Figure 6B:
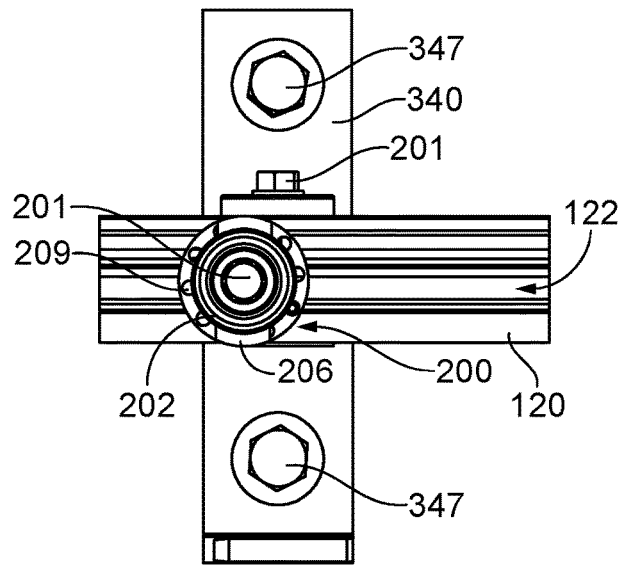
Figure 6C:
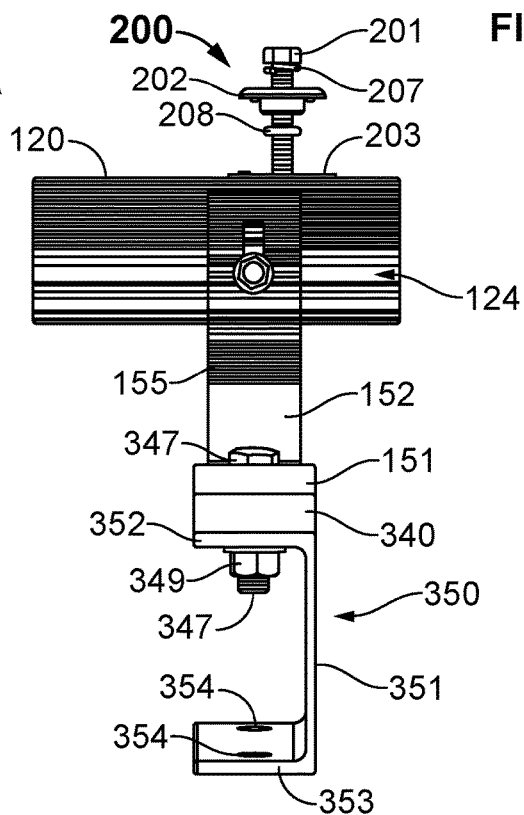

Referring initially to FIGS. 1-10, the retention system 100 comprises a rail 120, a channel nut 160 with a biasing element 180 cooperating with interior structures of the rail 120 according to an embodiment of the invention. The rail 120 may be formed by extrusion manufacturing in a predetermined cross-sectional design for operatively connecting to the channel nut 160 inserted in the first opening 122 and second opening 124 in the rail 120, as shown in FIGS. 4-5. Operatively, the channel nut 160 has a dimension less than the width of the first and second openings 122, 124 so as to be inserted through either opening 122, 124, to engage the channel nut 160 with the tooth 125 and the anchor latch 133. The uniform structure of the first and second openings 122, 124 are configured to operatively connect the channel nut 160 therein, e.g. click into each of the openings (e.g. same cross-sectional profile). The fastener 201 and channel nut 160 are used to couple the rail 120 to a stand support 350 to the surface 107, and are also used to secure devices to the lateral rail 120 or in connecting lateral lengths of the rail 120. A connector 112 configured in a suitable dimension can join longitudinal sections of the rail 120 as shown in FIGS. 1-2, whereby the connector 112 may be inserted into each the guide channel 140 of respective longitudinal sections of rail 120 and secured by fasteners 114, such as self-tapping screws, or formed with a plurality of openings 115 for receiving the fasteners 114 therethrough.

According to an embodiment of the invention shown in FIGS. 1-4 and 6A-6C, the retention system 100 also comprises a support 340 having a top portion 341, a bottom portion 342, side portions 343a and 343b, and end portions 344a and 344b. The support may be configured with a threaded post 345 located on said top portion, and one or more openings 346 configured to receive a fastener 347 therethrough. As can be seen with further reference to FIG. 16, the threaded post 345 is configured to be received in the slot 154 in the base portion 151 and secured by a nut 349, which configuration may include a washer 348. The support 340 is useful to operably connect to the structure 101 via fasteners secured to beam 103 through openings 346 and to support a forward edge of the PV module 107. The top portion 341 can be configured in a desired angle of elevation for the PV module 107 to allow optimal exposure to electromagnetic energy thereof. The retention system 100 also comprises a stand support 350 useful to provide spacing above the surface 102. The stand support 350 comprises a body 351 having an upper edged portion 352 and lower edged portion 353. The upper edged portion 352 includes openings 354 for securing to aligned openings 346 of the support 340 and stand support 350 using suitable fasteners 347, washers 348, and nuts 349. The lower edged portion 353 includes openings 354 for securing to the structure 101, e.g. using suitable fasteners 109 to join to a beam 103 as shown in FIG. 1.

Figure 7:
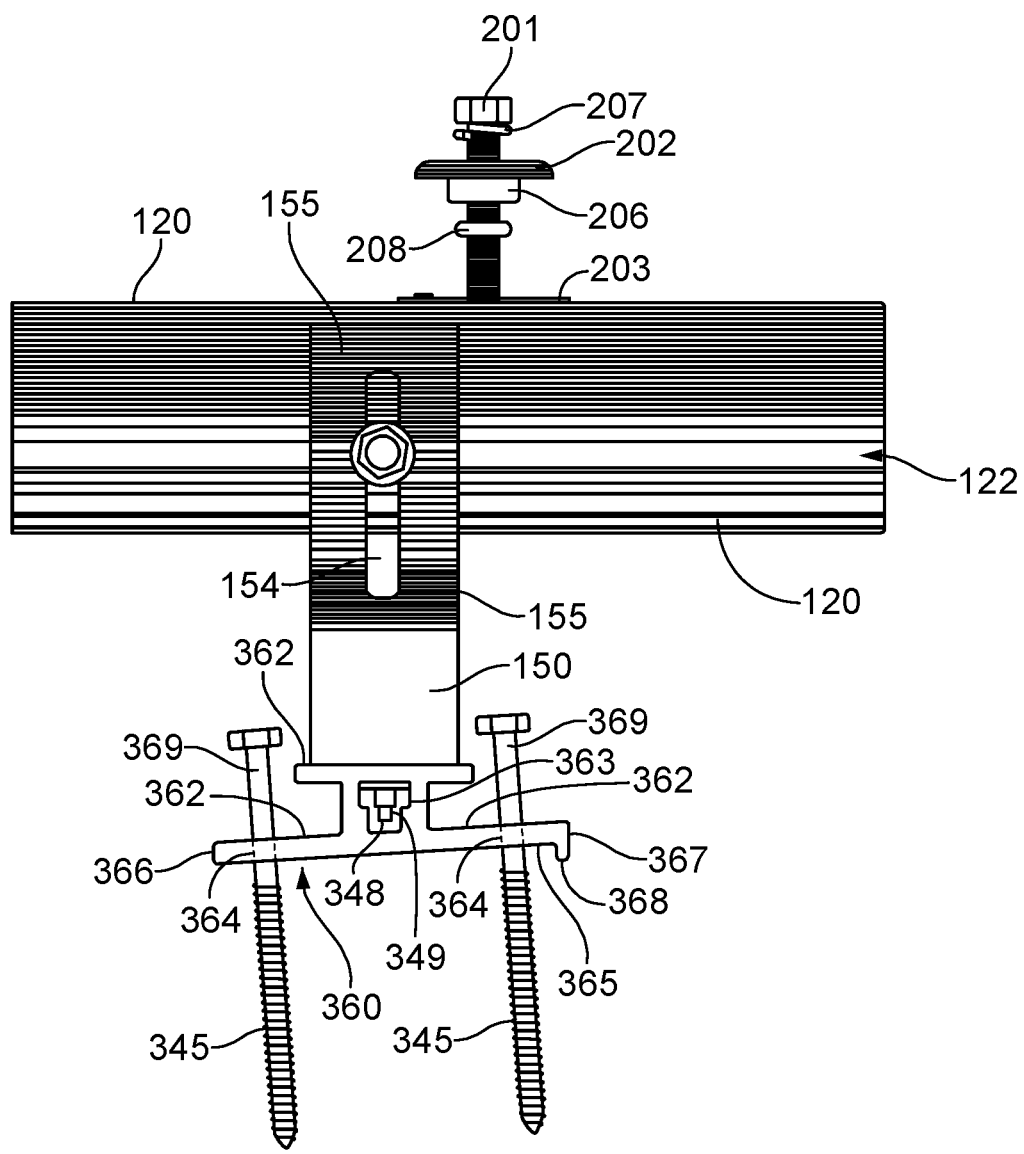
FIG. 7 illustrates a rear view of another embodiment of the invention.

According to another embodiment of the invention shown in FIGS. 5 and 7, the retention system 100 also comprises a flanged support 360 having a multi-dimensional body 361 having a top portion 362 formed with a nut cavity portion 363, a bottom portion 365, one or more openings 364 extending from the top and bottom portions 362, 365 through the body 361, and edges designated front edge 366 and rear edge 367 having a flange 368 extending from the bottom portion 365 of the body 361. The flanged support 360 is useful to engage the structure 101, for example, the flange engages a stepped structure of an island style roof via fasteners 369 engaging the beam 103 and/or directly to the structure 101.

Figure 8:
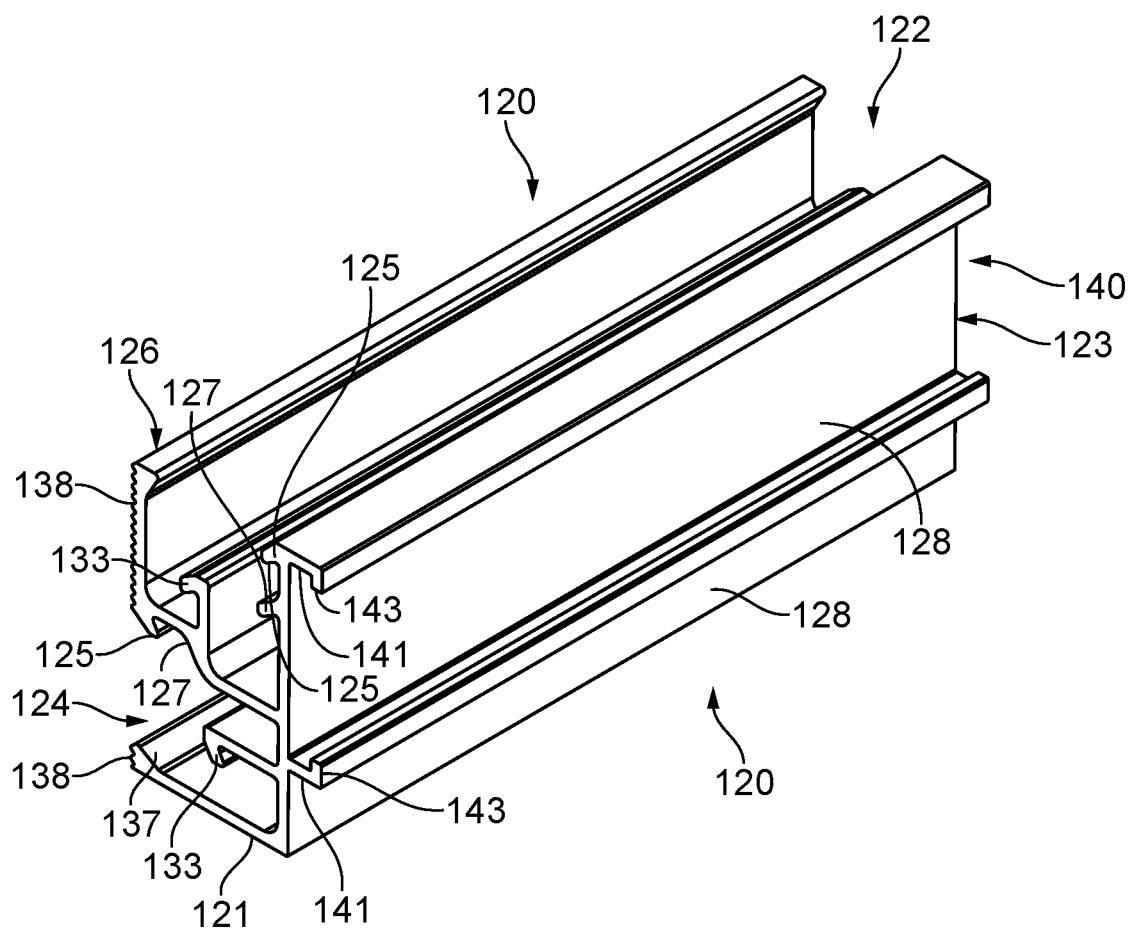
FIG. 8 illustrates a perspective view of the rail according to an embodiment of the invention.
Figure 9:
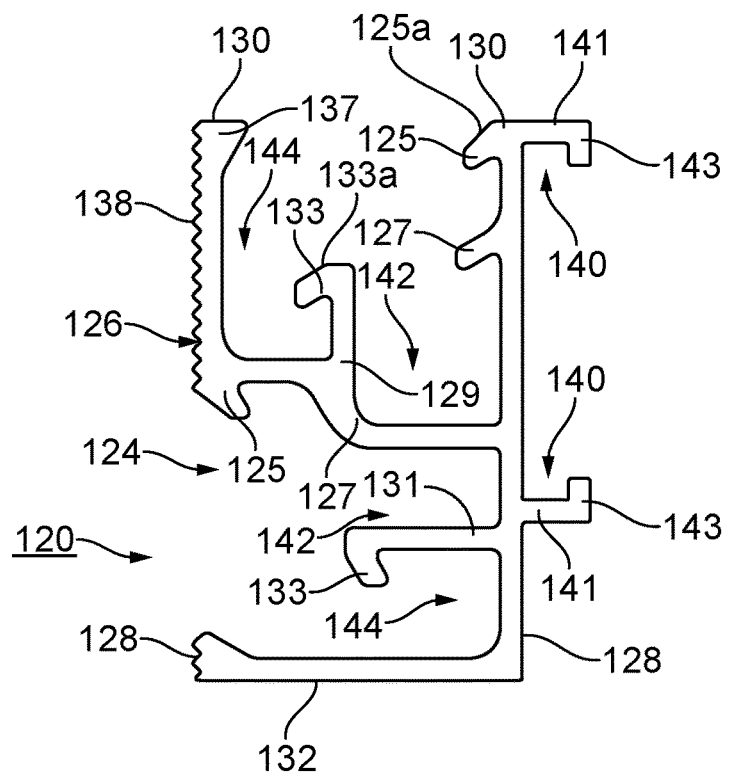
FIG. 9 illustrates a side view of the rail of the invention thereof.
Figure 10:
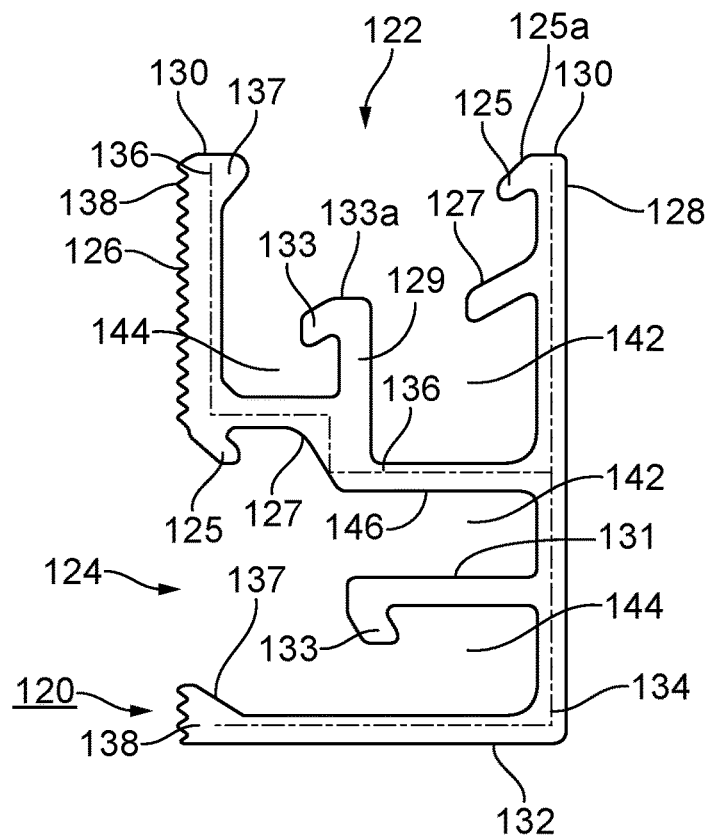
FIG. 10 illustrates a side view of the rail according to another embodiment of the invention.

As illustrated in FIGS. 8-10, the rail 120 may be formed in longitudinal lengths that have two ends 121 and 123, first and second side portions 126, 128 and a top portion 130, and a bottom portion 132. The side portion 126 can also comprise rows of grooves 138 configured to interface with grooves 155 on the bracket 150 or other device. The rail 120 can be manufactured by metal and/or metal alloy extrusion techniques to provide such longitudinal sections that are cut to suitable lengths. The rail 120 is formed with a device base 134 and a mount base 136 formed by a contiguous wall in the structure of the rail 120. The device base 134 comprises a contiguous wall in the structure of the rail 120 using the second side portion 128 and bottom portion 132 to form a wall of material of suitable strength and dimension such that the extruded material distributes the load from a device (PV panel, inverter, control, etc.) via the first side portion 126 to the bottom portion 132. The mount base 136 comprises a contiguous wall in the structure of the rail 120 using the first side portion 126 connected by a strut 146 to the second side portion 128. The top portion 130 is formed with the first opening 122 located on an upper side between the first and second side portions 126, 128. The first side portion 126 is formed with the second opening 124 located on a side lower section between a wall of the mount base 136 and the bottom portion 132. The rail 120 can also comprise a guide channel 140 formed on the second side portion 128 by a pair of arms 141 configured with flanges 143 at a distal end of the arms thereof.

As shown in, e.g., FIGS. 9 and 10 each of the first and second openings 122, 124, comprise a first channel portion 142 and a second channel portion 144. Each the first and second openings 122, 124 are further configured with structures of a tooth 125 having an upper sloped surface 125a, and a shelf 127. First opening 122 further comprises a first support 129 having an anchor latch 133, and second opening 124 further comprises a second support 131 also having an anchor latch 133. Both first and second openings 122, 124, further comprise space for travel of the channel nut 160 and fastener 201 formed therein so as to operably connect the flange 168 and hook flange 172 of the channel nut 160 to the rail 120.

Each of the first and second channel portions 142, 144 are segmented by support 129 and 131, respectively. For example, the first and second channel portions 142, 144 are segmented by the supports 129, 131, each having the anchor latch 133 oriented and/or disposed in the second channel portion 144. For example, the support 129 in the first channel portion 142 is located on a wall of the mount base 136, and the support 131 in the second channel portion 144 is located on an interior wall of the device base 134. Each of the first and second supports 129, 131 have the anchor latch 133 configured to operably connect to the hook flange 172 and is used to secure channel nut 160 to mount the L-bracket 150 and/or other devices to the rail 120, or a connector 112 or clamp assembly 200 therein. Similarly, the second channel portion 144 is configured for operably connecting the anchor latch 133 to the hook flange 172 of the channel nut 160 to mount the L-bracket 150 and/or other devices to the rail 120, or a connector 112 or clamp assembly 200 therein.

Each of the first and second openings 122, 124 comprise a sloped surface 137 located in the second channel portion 144 at an edge of the wall, for example, the first opening 122 has a sloped surface 137 formed at an edge of the second side portion 128 and the second opening 124 has a sloped surface 137 formed at the edge of the bottom portion 132. The sloped surface 137 is sloped in the direction of force to direct engagement of the anchor latch 133 and tooth 125 with the flange 168 and hook flange 172 of the channel nut 160 by the force of the biasing member 180. In operation, once the channel nut 160 is inserted into the first and/or second openings 122, 124, the biasing member 180 engages the sloped surface 137 to oppose traversal of the channel nut 160 from the first and/or second openings 122, 124, or retard movement of the channel nut 160 out of the first and/or second openings 122, 124. It is preferable that the channel nut 160 may be released and removed with suitable force by the user.

Each of the first and second openings 122, 124 have a first channel portion 142 configured with a tooth 125 formed on an edge of the opening, for example, in the top portion 130 and a shelf segment 127 formed in a wall of the first side portion 126 configured for limiting travel of the channel nut 160 into the first and/or second openings 122, 124. Each of the first and second openings 122, 124 have a second channel portion 144 configured with a sloped surface 137 formed on an edge of the bottom portion 132 and the anchor latch 133 extending transversely from the support 129 in the first opening 122 and/or support 131 in the second opening 124. The first channel portion 142 is configured to receive and operably connect to the channel nut 160 via flange 168 and a second channel portion 144 is configured to receive and operably connect to the channel nut 160 via hook flange 172.

The first channel portion 142 also comprises a tooth 125 formed on an edge of the opening in the top portion 130, or first side portion 126, and a shelf segment 127 configured for limiting travel of the channel nut 160 into the opening. The second channel portion 144 also comprises a sloped surface 137 formed on an edge of each of the first and second openings 122, 124 sloped in the direction of force to direct engagement of the anchor latch 133 with the hook flange 172 and tooth 125 with the flange 168 of the channel nut 160 by the force of the biasing member 180, and additionally is used to secure devices to the rail 120 or in connecting lateral lengths of the rail 120. In the embodiment shown, the second opening 124 is arranged perpendicularly to and below the first opening 122. The arrangement of the first and second openings 122, 124 may vary such that each of the bottom portion 132 and first side portion 126 may have openings in different arrangements depending on the configuration of the rail 120 and/or mounting configuration, e.g. using support 340 and/or flanged support 360 in a solar PV array 108.

Referring to FIGS. 2-5, and 11-13, the channel nut 160 comprises a body 161 having ends 162, shown as 162a and 162b, front portion 163, rear portion 164, a top portion 165, and a bottom portion 166. The channel nut 160 is a multi-surface extrusion having structural elements that can be manufactured using metal and/or metal alloy extrusion manufacturing to form longitudinal lengths that are cut to suitable dimensions for the body 161. An opening 167 may be machined therein adapted to receive the fastener 201 of a clamp assembly 200 therein, the opening 167 extending between the top portion 165 and bottom portion 166. The front portion 163 of the body 161 further has a flange 168 formed between the top portion 165 and the front portion 163 configured to operably connect with the tooth 125 of the rail 120. The front portion 163 may also have an angled surface 169 formed between the front portion 163 and the bottom portion 166 so as to in interface with the shelf 127 of the rail 120.

Figure 11:
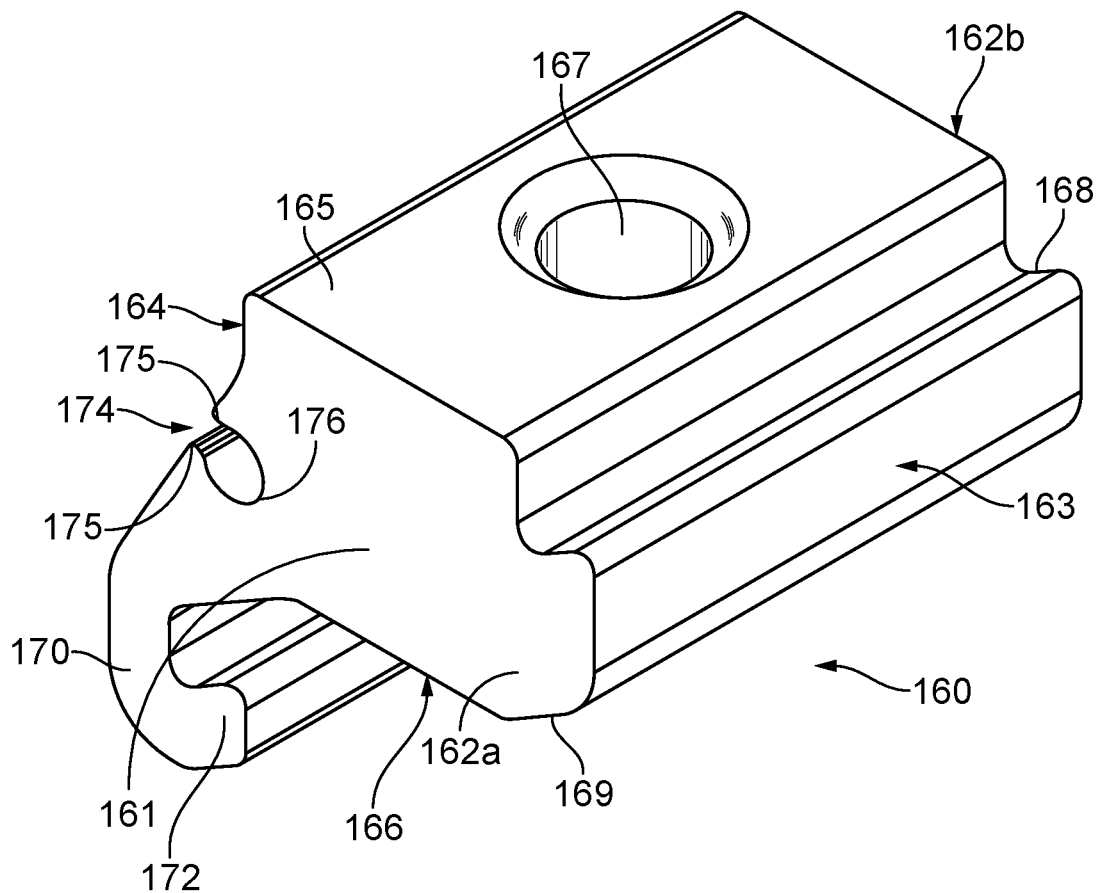
FIG. 11 illustrates a perspective view of the channel nut according to an embodiment of the invention.
Figure 12:
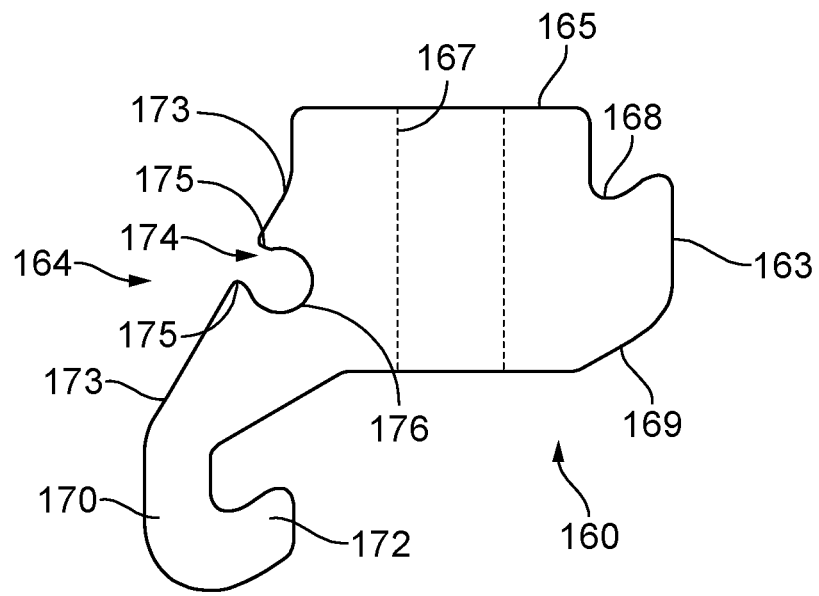
FIG. 12 illustrates a side view of the channel nut of the invention thereof.
Figure 13:
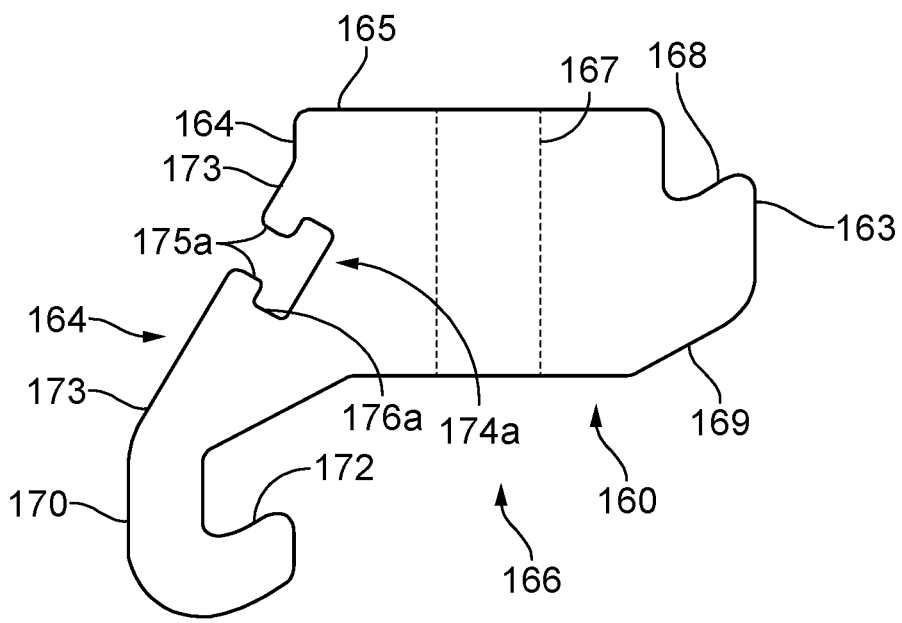
FIG. 13 illustrates a side view of the channel nut according to another embodiment of the invention.
Figure 14A:
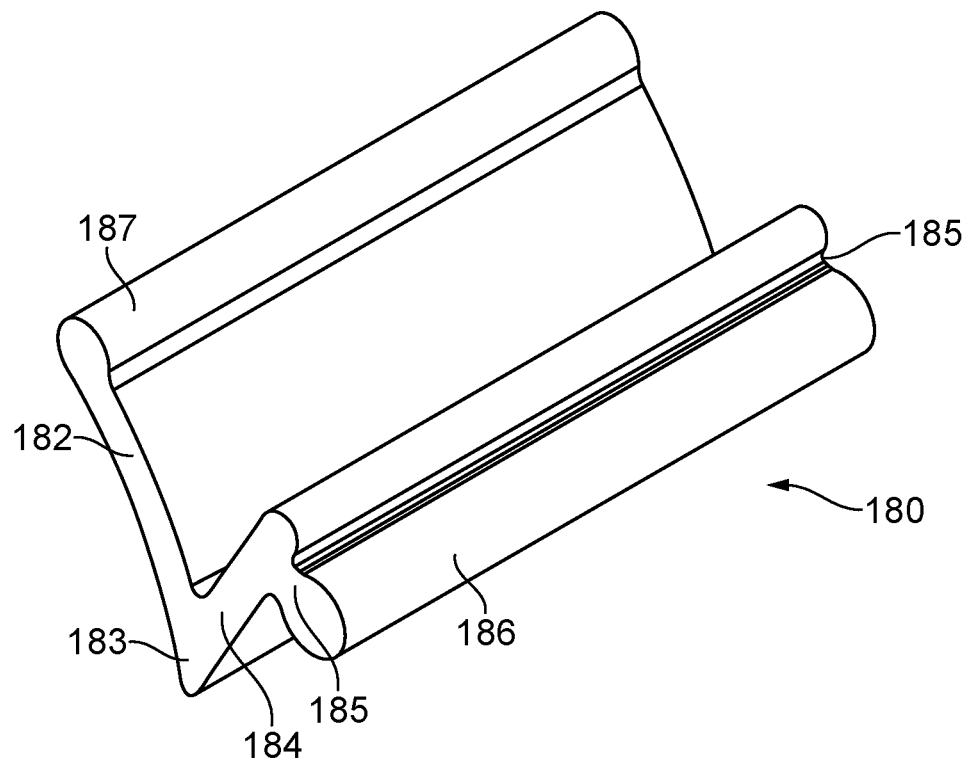
FIG. 14A illustrates a perspective view of the bias element.
Figure 14B:
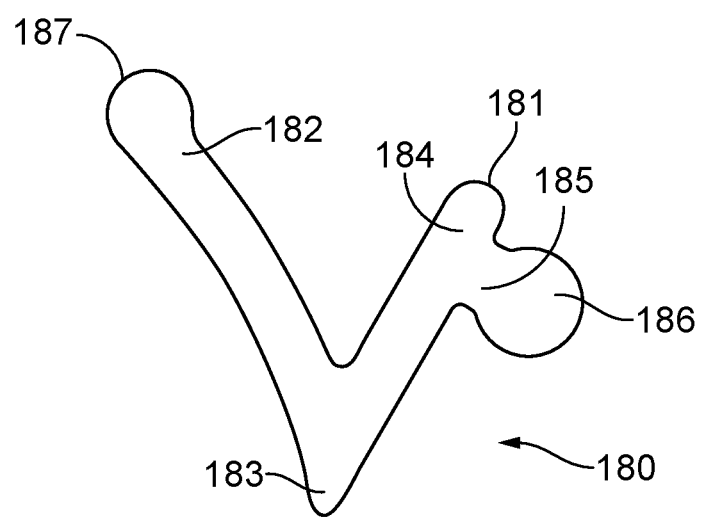
FIG. 14B illustrates a side view according to an embodiment of the invention.
Figure 15A:
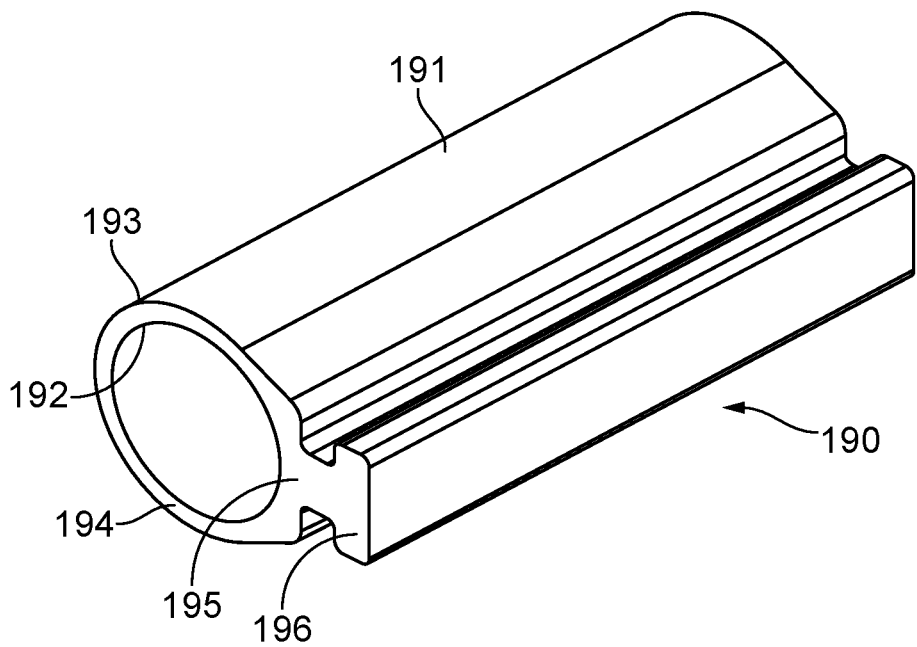
FIG. 15A illustrates a perspective view of the bias element.
Figure 15B:
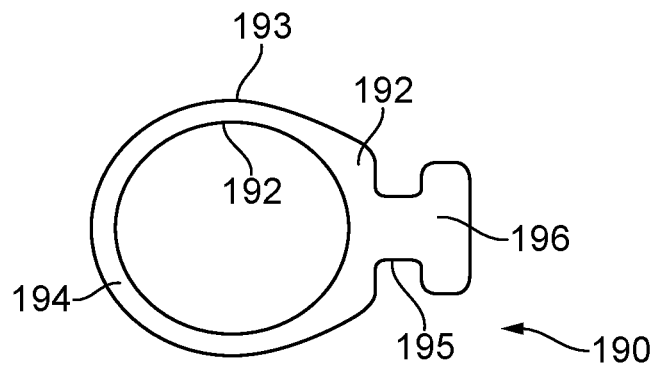
FIG. 15B illustrates a side view according to another embodiment of the invention.

As illustrated in FIGS. 11-13, the rear portion 164 may be configured with an extension 170 extending from the rear portion 164 and bottom portion 166, the extension 170 having a hook flange 172 at the end thereof for interfacing with the anchor latch 133. The rear portion 164 may have a beveled portion 173 having a receiver slot 174 formed therein. The receiver slot 174 may comprise an inlet 175 configured to receive a stem segment 185 and a channel 176 of a dimension larger than the inlet 175 configured to receive a channel portion 186 of the bias element 180 therein, as shown in FIGS. 4-5, 11-13. 12 as shown as well as in FIGS. 14A-14B and 15A-15B. The bias element 180 is configured to use the beveled portion 173 cooperating with the insertion of the channel nut 160 configured to engage surfaces of the rail 120 when the channel nut 160 is inserted such that the bias element 180 forces the channel nut 160 onto the lip and tooth 125 for engagement thereon.

Referring to FIGS. 4, 5, 12-13, 14A-14B and 15A-15B a biasing element 180, 190 is described, where FIGS. 4, 12, and 14A-14B disclose a biasing element 180 according to an embodiment of the invention, and FIGS. 5, 13, and 15A-15B disclose a biasing element 190 according to another embodiment of the invention. The bias element 180, 190 may be secured, affixed and/or formed integral with the channel nut 160. The bias element 180, 190 may be formed from rubber or other suitable materials of sufficient dimension, durability and strength to move by deflection and/or deformation by the sloped surface 137 as the channel nut 160 is inserted in the first channel 122 and/or the second channel 124 openings when inserted directly such as, for example, in an orthogonal direction. As the channel nut 160 is inserted further, the resistance of the biasing element 180, 190 moves the channel nut 160 to engage the flange 168 and hook flange 172 with the tooth 125 and the anchor latch 133, respectively, of the rail 120. The biasing element 180, 190 is capable of securing within the rail 120 to permit the channel nut 160 to be located at a desired location along the length of the rail 120, or structures 125, 133 incorporating the features of the rail 120, thereby further facilitating the installation of the retention system 100 in other fields of use for attaching panels and items such as, for example, aircraft, vehicles and other industrial applications.

For example, as illustrated in FIGS. 4, 12, and 14A-14B, the biasing element 180a comprises a body 181, lever arm 182, fulcrum 183, and resistance arm 184. The body 181 comprises a stem segment 185 and a channel portion 186 each respectively configured to be received in the inlet 175 and channel 176 of the channel nut 160. The biasing element 180, 190 is configured to deflect or move by the resistance of the edge 137 of the rail 120. For example, the bias element 180 may be formed from rubber or other suitable materials of sufficient dimension, durability and strength to bias the entry of the channel nut 160 in a force direction to engage the tooth 125 and the anchor latch 133 by the flange 168 and hook flange 172, respectively, of the channel nut 160. The bias element 180, 190 may be of any design that can affix the lever arm 182 and fulcrum 183 to the beveled portion 173 of the channel nut 160 such as by operably connecting the channel portion 186 to the inlet 175 and channel 176. The combined resistance by the fulcrum 183 when the resistance arm 186 and/or end segment 187 slides along the sloped surface 137 during a motion to insert the channel nut 160 directly into the openings 122, 124 of the rail 120. The fulcrum 183 provides a resistance force such that the bias of the fulcrum 183 deflects the effort of on the lever arm 182 to the effort fulcrum 183 to move the channel nut 160 onto the tooth 125 and anchor latch 133 for engagement thereon. The inlet 175 is formed in a suitable shape and dimension to complement the shape of the stem segment 185 to allow insertion therein. The channel portion 186 is formed in a suitable shape and dimension, such as circular and/or arcuate segments, that compliments the shape of the channel 176 to allow insertion therein. For example, the bias element 180 may be formed from rubber or other suitable materials of sufficient dimension, durability and strength to bias the entry of the channel nut 160 in a force direction to engage the tooth 125 and the anchor latch 133 by the flange 168 and hook flange 172, respectively, of the channel nut 160. As a result, the biasing element 180 is configured to deflect or move by the resistance of the lever arm 182 and end segment 187 against sloped surface 137 on the interior of the rail 120.

Similarly, as illustrated in FIGS. 5, 13, and 15A-15B according to another embodiment of the invention, the bias element 190 comprises a body 191 having an inner diameter 192 and an outer diameter 193 forming a wall 194 that can bias by deforming and returning to an original shape of the body 191, and a stem segment 195 connected to a channel portion 196 that is retained in a receiver slot 174a including an inlet 175a and channel 176a of FIG. 13. The shape of the inlet 175a compliments the shape of the stem segment 195 to allow insertion therein. The channel 176a also may be formed in any shape or line segments that compliments the shape of the channel portion 196 to allow insertion therein. It is to be appreciated that the channel 176a may be formed in any shape or line segment that compliments the shape of the channel portion 196. The biasing element 190 is configured to overcome the resistance by deflecting to move past the edge having the sloped surface 137 of the rail 120 and into the opening 122 and/or 124 of the rail 120. The bias element 190 may be formed from rubber or other suitable materials of sufficient dimension, durability and strength of the wall 194 to bias the entry of the channel nut 160 into the first and/or second channel 122, 124 to engage the tooth 125 and the anchor latch 133 by the flange 168 and hook flange 172, respectively, of the channel nut 160. It is to be appreciated that while the bias element 190 may be formed with a wall 194, the bias element 180, 190 may be configured from solid materials and all that is required is to provide a deflection and resistance force upon insertion into the openings 122, 124.

Figure 17:
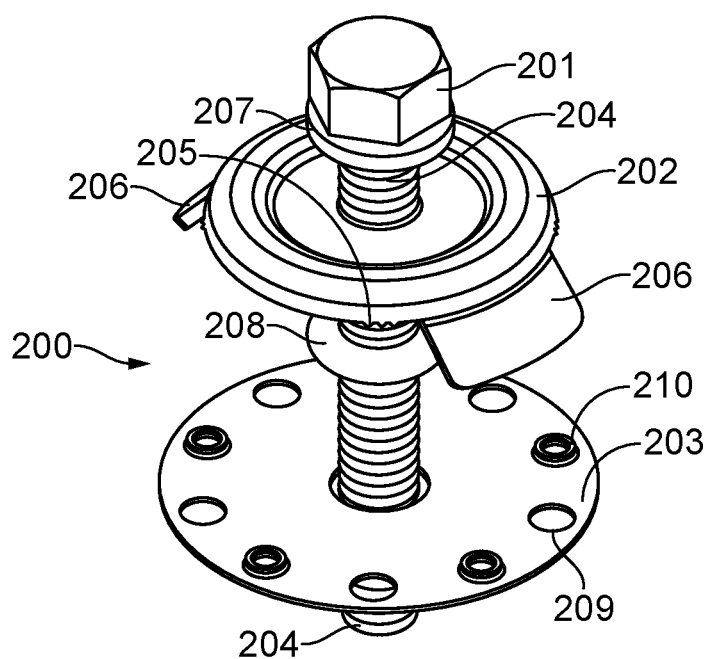
FIG. 17 illustrates a perspective view of the panel support assembly.
Figure 18A:
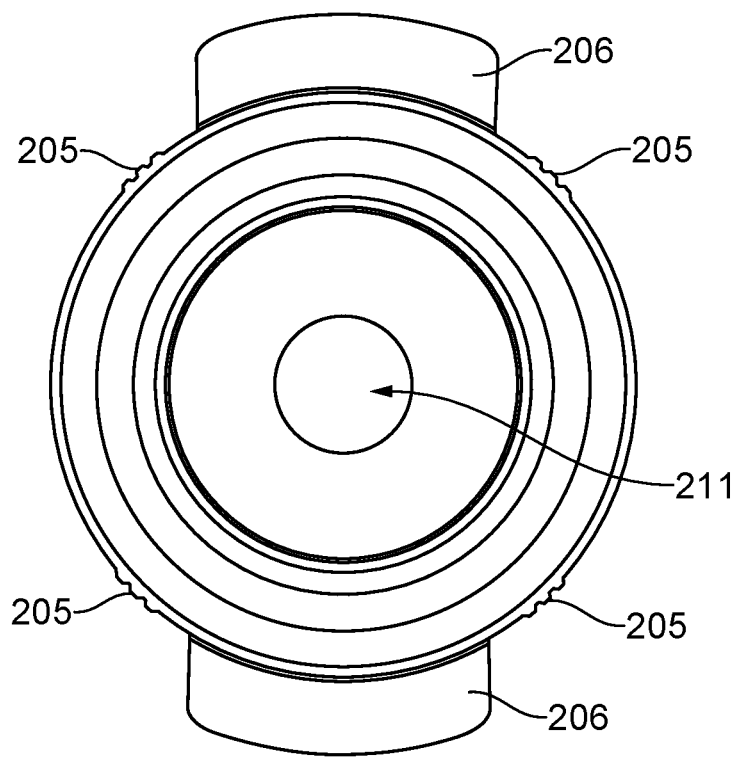
FIGS. 18A and 18B illustrate top and side views, respectively, of the top spacer of the invention.
Figure 18B:
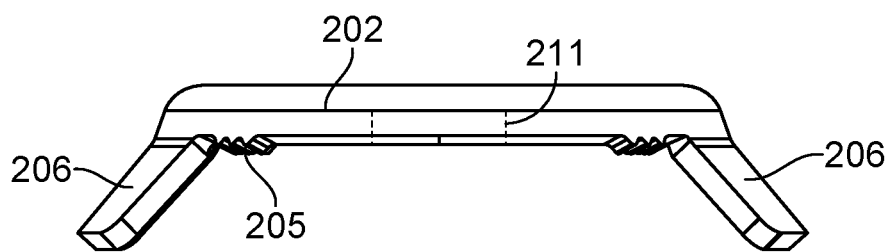

Referring to FIGS. 1-3, 6A-6C, 7, 17, and 18A-18B, the clamp assembly 200 comprises a fastener 201, washer 202, and grounding washer 203. The fastener 201 may be of a suitable dimension and strength to clamp and hold the panel 107 or other item, for example, a screw, self-tapping screw, bolt 201 with a threaded portion 204 for operably connecting with the opening 167 of the channel nut 160. Any such fastener 201 is configured to secure the respective rail 120 and channel nut 160. The washer 202 has an opening 211 so as to receive the fastener 201 and/or grounding washer 203 therethrough as shown in FIGS. 17 and 18A-18B. The washer 202 comprises protrusions or teeth 205 located on a lower edge thereof for forming an operable grounding connection with a panel 107, and one or more tabs 206 for providing spacing between panels 107. The clamp assembly 200 may additionally comprise a washer 207 disposed between the head of the bolt 201 and the washer 202, and a rubber washer 208 disposed between the washer 202 and the grounding washer 203.

Figure 16:
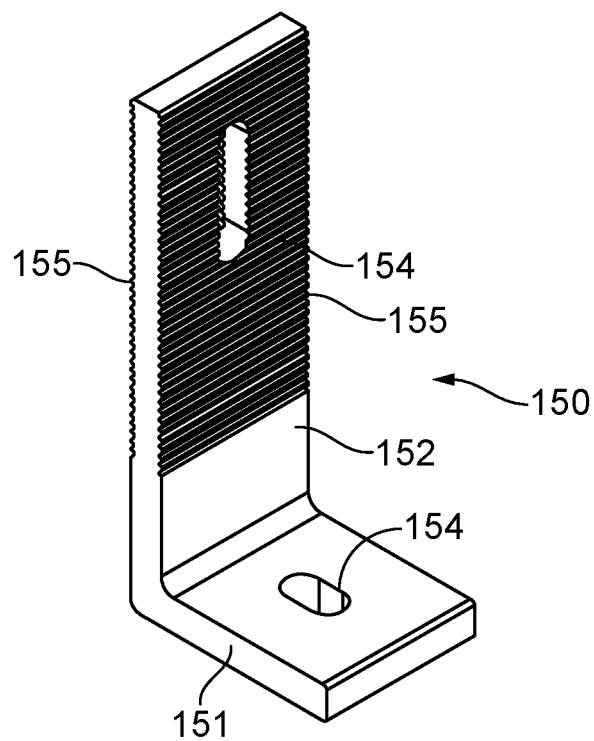
FIG. 16 illustrates a perspective view of the L-bracket of the invention.

Referring to FIG. 16, a bracket 150 may be used for operably connecting the retention system 200 to the structure 101 via support 340, stand support 350, and/or support flange 360. The bracket 150 provides elevation above the surface 102 at a predetermined distance as desired and a grounding connectivity to the structure 101. The bracket 150 comprises a base 151 and an extension 152 with a groove portion 155 on one or more sides of the extension 152 for height adjustment of adjacent PV modules 107 in a PV array 108. For example, the bracket 150 of the retention system 100 can be an angle or corner bracket, for example, L-shaped bracket having a base segment 151 and an extension segment 152 formed with one or more grooves or irregularities 155 on one or more side surfaces for operably connecting the L-bracket 150 to the structure 101 and/or rail 120. The groove portion 155 can further provide an operable grounding connection to the rail 120 and/or the fastener 201. An opening 154 may be formed in the base 151 and/or the extension 152 to provide an opening for a fastener 201, for example, to fasten the base 151 to the support 340, stand support 350, and/or support flange 360 or to fasten the connector 112 to the rail 120 using a fastener 114 and the channel nut 160. The opening 154 may further be formed as a slot so as to allow the fastener, e.g. 201, to move within the opening 154 to provide adjustments to solar panels 107 in the PV array 108, for example, in the x, y and/or z-axis for horizontal and vertical adjustments.

Figure 19A:
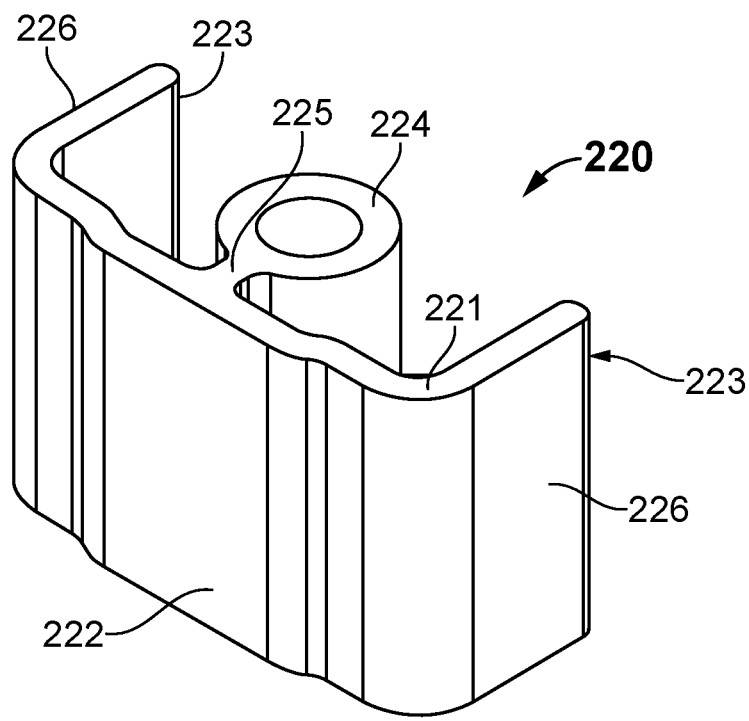
FIGS. 19A and 19B illustrate perspective and top views, respectively, of an end support of the invention.
Figure 19B:
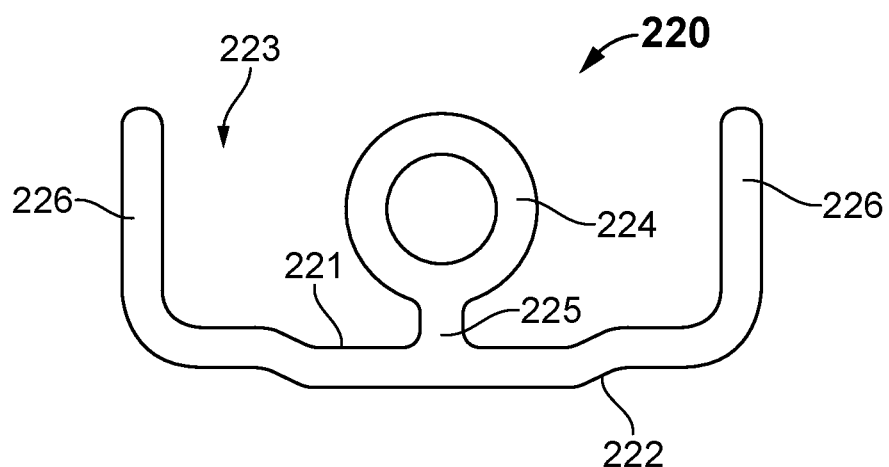

Referring to FIG. 19A-19B, a spacer 220 is also provided with the retention system 100 for use between the clamp assembly 200 and clamping nut 120 in securing a respective panel 107 at an end of a PV array 108. The spacer 220 comprises a body 221 having a front portion 222, rear portion 223, a guide portion 224 attached by a connection 225 to the rear portion 223, and one or more side portions 226 configured for engaging a top portion 130 of the rail 120. The spacer 220 is a multi-surface extrusion having structural elements that can be manufactured using metal and/or metal alloy extrusion manufacturing to form longitudinal lengths that are cut to suitable dimensions, e.g. the spacer has a dimension corresponding to a frame dimension of the panel 107 for securing the clamp assembly 220 thereto. The guide portion 224 is configured to receive the fastener 201 therethrough so as to allow the threaded portion 204 to operably connect to the opening 167 in the channel nut 160, as shown in FIGS. 1 and 3.

Figure 20A:
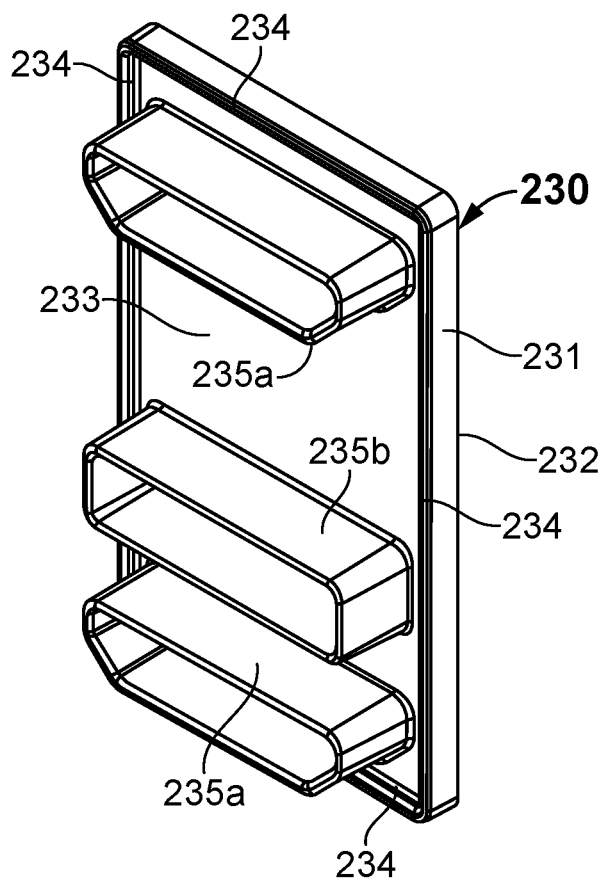
FIGS. 20A and 20B illustrate perspective back view and back view, respectively, of an end cap of the invention.
Figure 20B:
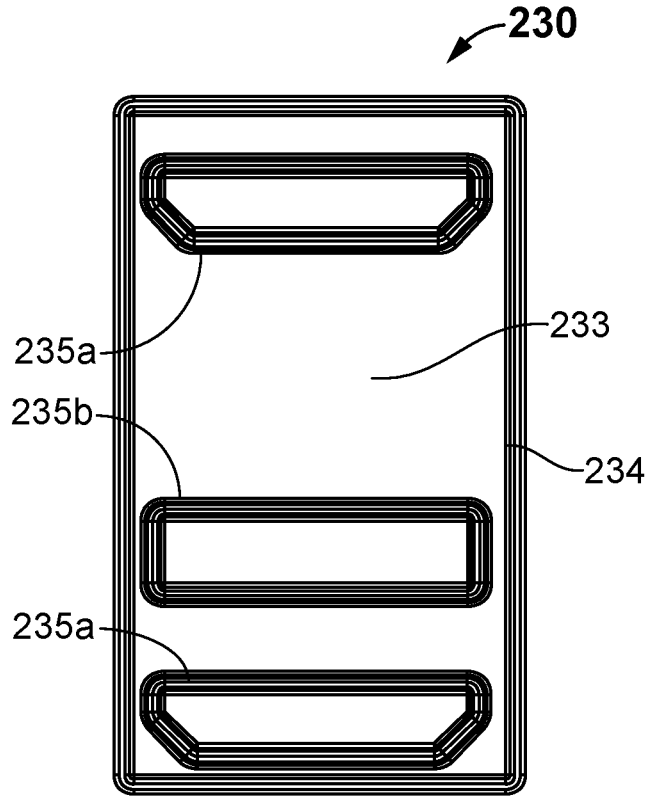

Referring to FIG. 20A-20B, an end cap 230 is also provided for use to close open ends of the rail 120, as desired, in the retention system 100. The end cap 230 comprises a body 231 having a front portion 232, a rear portion 233, edge portion 234, and one or more connector portions 235 extending from the rear portion 233. The front portion 232 may be configured smooth or with textures for a decorative appearance. The rear portion 233 is configured to operably connect to the end of the rail 120 using the one or more connector portions 235. The connector portions 235 can be configured in a variety of shapes so as to conform to a corresponding dimension of the rail, for example, designated shapes of channel connector portions 235a and 235b. Moreover, the edge portion 234 on the end cap 230 is configured to operably connect the perimeter of the rail 120 so as to close the end from dirt and other environmental contaminants.

Figure 21C:
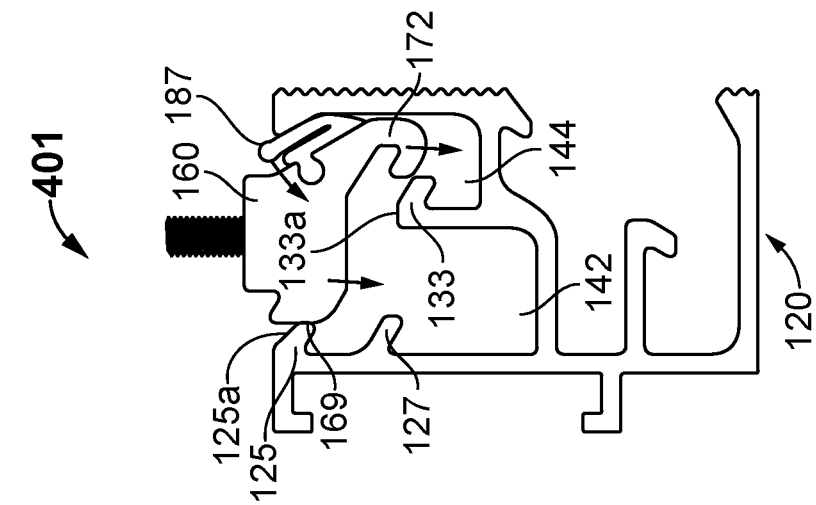
FIGS. 21A through 21F illustrate the operation of the rail and channel nut apparatus, system and method according to an embodiment of the invention.
Figure 21B:
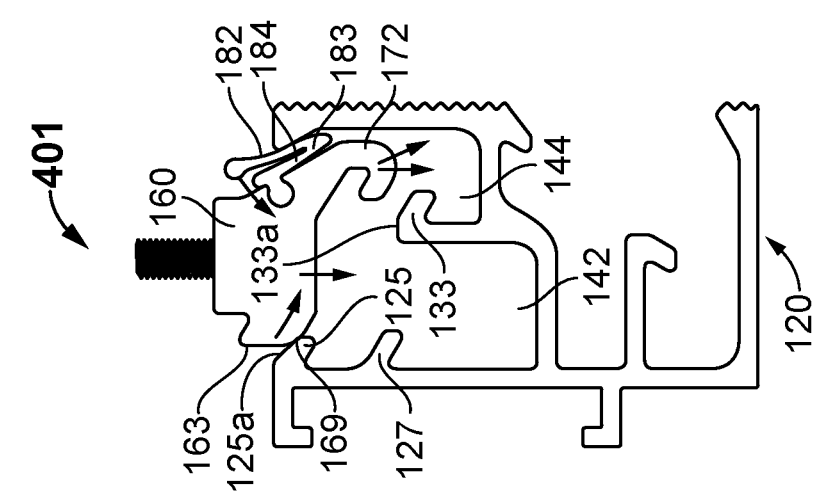
Figure 21A:
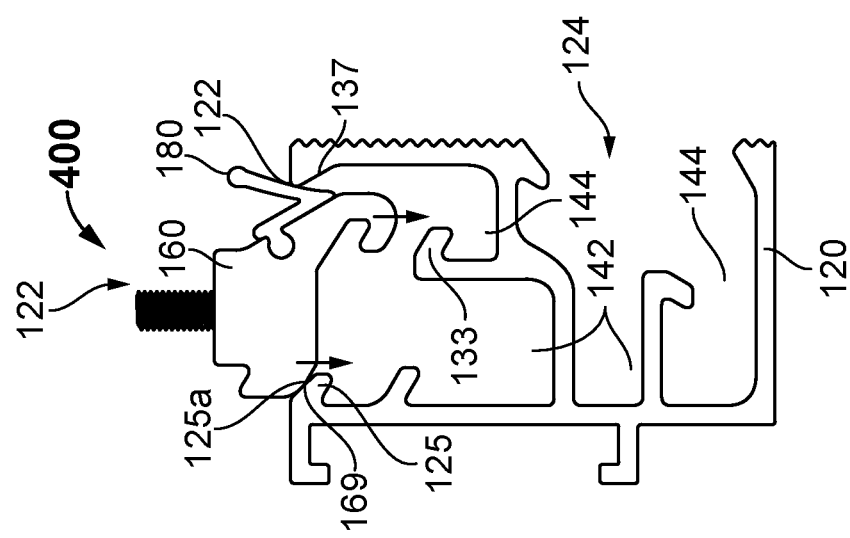

The operation of the rail and channel nut apparatus, system and steps of the method 100 according to an embodiment of the invention is generally designated as 400 and illustrated in FIGS. 21A through 21F, and 22. As illustrated in FIG. 21A, the channel nut 160 is positioned for entry into the first opening 122 in the top portion 130 of the rail 120. Similarly, the channel nut 160 may also be positioned for entry into the second opening 124 in the first side portion 126 of the rail 120.

Figure 21F:
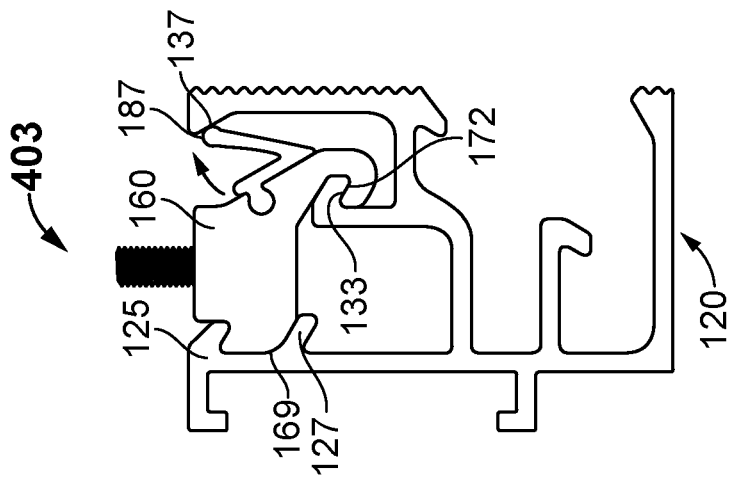

As illustrated in FIG. 21B, in a Step 401, applied force of the channel nut 160 starts entry into the first opening 124, thereby compressing the biasing element 180 while moving the channel nut 160 into the second channel portion 144, and also the applied force causes the angled surface 169 of the channel nut 160 to slidably engage to move along the sloped upper surface 125a of the tooth 125. As illustrated in FIG. 21C, continued applied force of the channel nut 160 causes the angled surface 169 to clear the sloped surface 125a tooth 125 to enter the first channel portion 142. Also, continued applied force on the channel nut 160 provides further compressing of the lever arm 182 against the resistance arm 184 storing energy in biasing element 180 as the channel nut 160 continues entry in the second channel portion 144. As illustrated in FIG. 21D, force is applied until the bottom portion 166 of the channel nut 160 is stopped by the upper surface 133a of the anchor latch 133.

Figure 21E:
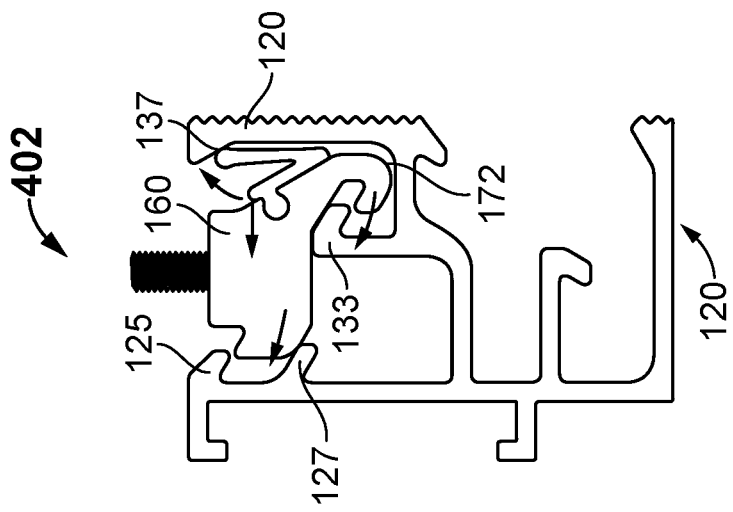
Figure 21D:
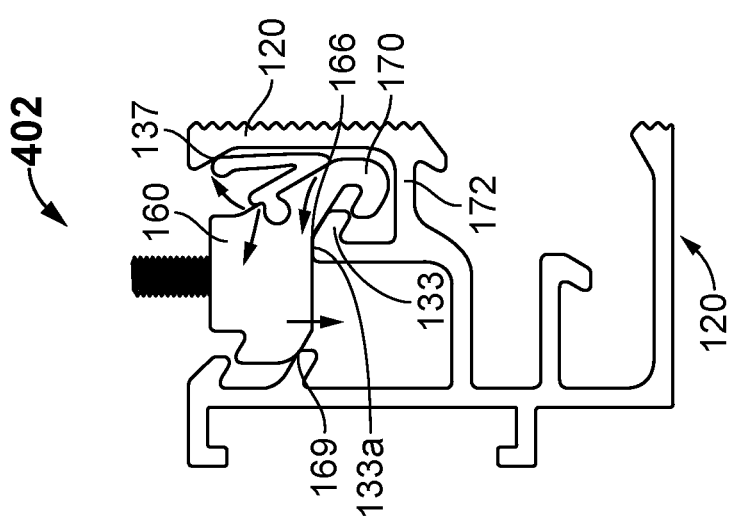

As illustrated in FIG. 21E, in a Step 402, the applied force is stopped so that the stored energy in the biasing element 180 causes the angled surface 169 to move towards the shelf 127, thereby engaging a portion of the angled surface 169 to the shelf 127 so as to provide further stoppage first channel portion 142. It is appreciated that the hook flange 172 is unrestrained in the second channel portion 144, and because of the stored energy in the biasing element 180, the hook flange 172 also moves towards the anchor latch 133, thereby engaging a portion of the hook flange 172 with the anchor latch 133.

As illustrated in FIG. 21F, in a Step 403, the applied force is completely removed. The channel nut 120 moves the angled surface 169 into the space between tooth 125 and the shelf 127 using a force of the stored energy of the biasing element 180, thereby securing the angled surface 169 therebetween. Similarly, channel nut 120 moves the hook flange 172 into an operable connection with the anchor latch 133 using a force of the stored energy of the biasing element 180, thereby securing the hook flange 172 and anchor latch 133 together. The end segment 187 further engages the sloped surface 137, and it is appreciated that the end segment may be formed in a variety of shapes, e.g. arcuate, round, smooth or other shape, sufficient to slidingly engage the sloped surface 137 upon entry and/or to apply the forces of the biasing element 180 to move the channel nut 160 into engagement in the first and second openings 122, 124 of the rail 120. Thereafter, the channel nut 160 is held by the force of the biasing element 180 in the relative position in which it was inserted into the first opening 122 in the rail 120. The channel nut 160 resists most movement from the rail, but may be removed by overcoming the forces applied to the biasing element 180.

Figure 22:
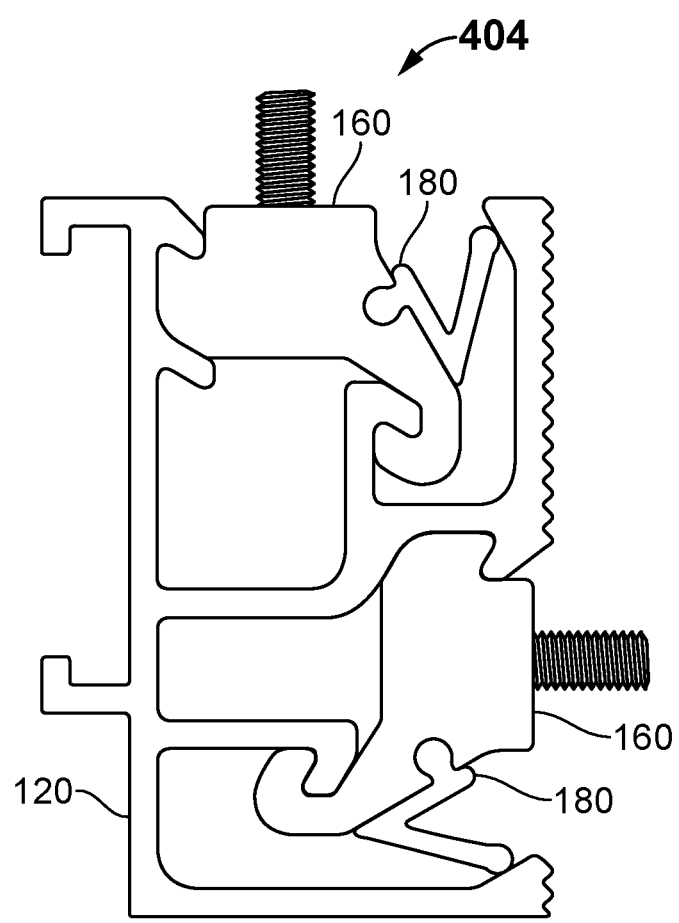
FIG. 22 illustrates a side view of the channel nut engaged in both channels of the rail and system.

As shown in FIG. 22, in a Step 404, the process of steps 1-3 can be repeated so as to position and insert another channel nut 160 into the second opening 124 opening in the first side portion 126 of the rail 120. Similarly, the channel nut 160 may be secured in the second opening 124 the hook flange 173 into an operable connection with the anchor latch 133 and the angled surface 169 positioned in the space between tooth 125 and the shelf 127.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The previous description of the disclosed embodiments is provided to enable any person skilled in the art to make or use the present invention. Various modifications to these embodiments will be readily apparent to those skilled in the art, and the generic principles defined herein can be applied to other embodiments without departing from the spirit or scope of the invention. For example, a wide variety of materials may be chosen for the various components of the embodiments. It is therefore desired that the present embodiments be considered in all respects as illustrative and not restrictive, reference being made to the appended claims as well as the foregoing descriptions to indicate the scope of the invention.

The invention claimed is:

1. A retention system for securing one or more devices to a structure, the retention system comprising:
   a rail, said rail being formed in a longitudinal length configured with a cross-sectional profile having a first channel portion with a recess formed between a tooth and a shelf and a second channel portion with an anchor latch and a sloped surface;
   a channel nut comprising a hook flange extending from an edge of a rear portion and a bottom portion, a flange extending from a front portion, and receiver slot including an inlet and a channel located on said rear portion, said channel nut configured in a dimension to be receivable directly within an opening of each of said first and second channel portions of said rail, wherein said hook flange is of a dimension to receive said anchor latch and/or said flange is of a dimension to be received within said recess formed between said tooth and said shelf to form cooperating structures between said rail and said channel nut, said channel nut further configured to couple to a clamp assembly, said clamp assembly being configured to hold the one or more devices; and
   a biasing element comprising a body having a lever arm joined to a resistance arm at a fulcrum, said biasing element having a channel portion joined by a stem segment on said resistance arm, said stem segment and said channel portion configured to be received in said inlet and said channel of said channel nut, respectively,
   wherein said clamp assembly operably couples each of said flange of said channel nut to said tooth of said rail, and said hook flange of said channel nut to said anchor latch of said rail, to securely hold the one or more devices.

* * * * *